US010191942B2

(12) United States Patent
Parker et al.

(10) Patent No.: US 10,191,942 B2
(45) Date of Patent: Jan. 29, 2019

(54) REDUCING COMPARISONS FOR TOKEN-BASED ENTITY RESOLUTION

(71) Applicant: SAP SE, Walldorf (DE)

(72) Inventors: Tim Parker, Loyal, WI (US); Jim Havlicek, Onalaska, WI (US)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 15/294,481

(22) Filed: Oct. 14, 2016

(65) Prior Publication Data

US 2018/0107730 A1 Apr. 19, 2018

(51) Int. Cl.
*G06F 7/00* (2006.01)
*G06F 17/30* (2006.01)

(52) U.S. Cl.
CPC .. *G06F 17/30442* (2013.01); *G06F 17/30528* (2013.01)

(58) Field of Classification Search
CPC ......... G06F 17/30598; G06F 17/30442; G06F 17/30528
USPC ......................................... 707/736, 737, 749
See application file for complete search history.

(56) References Cited

U.S. PATENT DOCUMENTS

| 6,243,713 | B1 * | 6/2001 | Nelson .............. G06F 17/30017 |
| 6,523,041 | B1 | 2/2003 | Morgan et al. |
| 7,908,279 | B1 * | 3/2011 | Thirumalai ......... G06F 17/2211 704/10 |
| 9,311,301 | B1 | 4/2016 | Balluru et al. |
| 2008/0140653 | A1 * | 6/2008 | Matzke ............. G06F 17/30943 |
| 2010/0169329 | A1 * | 7/2010 | Frieder ............. G06F 17/30687 707/752 |
| 2014/0129261 | A1 | 5/2014 | Bothwell et al. |

* cited by examiner

*Primary Examiner* — Md I Uddin
(74) *Attorney, Agent, or Firm* — Mintz Levin Cohn Ferris Glovsky and Popeo, P.C.

(57) ABSTRACT

A token-based database management system described herein may reduce an amount of comparisons during entity resolution of records. The system includes a token creator configured to create tokens from records, a token-record mapping creator configured to create a token-record mapping of tokens to records, a token importance calculator configured to calculate token importance values for the tokens, a token pruner configured to identify a token of the current record as unimportant based on token importance values of the tokens of the current record, and to remove the unimportant token from the token-record mapping, a record selector configured to select only records sharing at least one common token with the current record, and a record comparator configured to compare the current record with each of the selected records to determine whether the current record matches any of the selected records.

17 Claims, 9 Drawing Sheets

Token Importance Values 157

| Token | Importance |
|---|---|
| HOT | 85 |
| CHOCOLATE | 92 |
| HAND | 75 |
| LOTION | 70 |
| OZ | 5 |
| PACKET | 11 |
| 12 | 51 |
| 16 | 48 |
| ... | ... |

REDUCING COMPARISONS FOR TOKEN-BASED ENTITY RESOLUTION

BACKGROUND

When finding similar records within a set of records (e.g., entity resolution), one of the challenges is overcoming the N-Squared problem. This is, it is often undesirable or impracticable to compare each record to every other record within a set of records to find which records are similar to each other. For instance, comparing each record to every other record is not practical for anything but relatively small sets of records.

Some conventional techniques may use record blocking as a way of reducing the number of comparisons. Record blocking places two limits on how fuzzy the comparison of data can be. First, there must be some value that matches exactly between the two records, and, second, the data to be matched must appear in a fixed location within the record. Another conventional technique is the nearest neighborhood/sliding window approach that sorts the data in various ways and only compares those records within a certain distance (window) of the current record. The sort requires a predefined key. However, these conventional approaches may require intimate knowledge of the data to pick precisely the parts of the records that are required to match. With the democratization of data, more and more users are expecting to be able to work with data without having such technical knowledge. Also, these conventional approaches may cause problems handling free-form data (e.g., relatively unstructured data). For instance, record blocking places a restriction on where that data needs to appear within the record, and the nearest neighborhood/sliding window approaches uses a predefined key which is difficult to define with free-form data.

SUMMARY

In some embodiments, a system for reducing an amount of comparisons during entity resolution of records includes a database configured to store a plurality of records, and token-based entity resolution circuitry configured to determine whether a current record is similar to one or more other records in the database. The token-based entity resolution circuitry includes a token creator configured to create tokens from the plurality of records, a token-record mapping creator configured to create a token-record mapping of tokens to records, a token importance calculator configured to calculate token importance values for the tokens, where each token importance value represents a level of amount of information contained within a respective token, a token pruner configured to identify a token of the current record as unimportant based on token importance values of the tokens of the current record, and to remove the unimportant token from the token-record mapping, a record selector configured to select only records sharing at least one common token with the current record such that the at least one common token does not include the token identified as unimportant, and a record comparator configured to compare the current record with each of the selected records to determine whether the current record matches any of the selected records.

In some examples, the system may include one or more of the following features (or any combination thereof). The database may include a relational database. The token creator may be configured to create one or more tokens for each record using natural language processing that splits values of a respective record into individual tokens. The token importance values may be term frequency-inverse document frequency (tf-idf) values. The token pruner may be configured to identify a token having a highest token importance value within the current record, mark at least one token as unimportant when a token importance value of the at least one token is less than a predetermined threshold relative to the highest token importance value in the current record, and remove the at least one unimportant token from the token-record mapping such that records linked to the at least one unimportant token are not selected for comparison with the current record. The predetermined threshold may be a defined percentage of the highest token importance value. The records may include free-form data having an unstructured data format. The system may be an in-memory database system having a structured query language (SQL) engine configured to execute the token-based entity resolution circuitry to select records similar to the current record.

In some embodiments, a non-transitory computer-readable medium storing executable instructions that when executed cause at least one processor to create tokens from a plurality of records stored in a relational database, create a token-record mapping of tokens to records, calculate token importance values for the tokens, where each token importance value represents a level of amount of information contained within a respective token, identify a token of a current record as unimportant based on token importance values of the tokens of the current record, remove the unimportant token from the token-record mapping, select only records sharing at least one common token with the current record such that the at least one common token does not include the token identified as unimportant, and compare the current record with each of the selected records to determine whether the current record matches any of the selected records.

In some embodiments, the computer product may include one or more of the above/below features (or any combination thereof). The tokens may be created using natural language processing that splits values of a respective record into individual tokens. The token importance values may be term frequency-inverse document frequency (tf-idf) values. The operations may further include identify a token having a highest token importance value within the current record, mark at least one token as unimportant when a token importance value of the at least one token is less than a predetermined threshold relative to the highest token importance value in the current record, and remove the at least one unimportant token from the token-record mapping such that records linked to the at least one unimportant token are not selected for comparison with the current record. The predetermined threshold may be a defined percentage of the highest token importance value. The records may include free-form data having an unstructured data format.

In some embodiments, a computer-implemented method for entity resolution includes creating tokens from a plurality of records stored in a relational database, creating a token-record mapping of tokens to records, calculating token importance values for the tokens, where each token importance value represents a level of amount of information contained within a respective token, identifying a token of a current record as unimportant based on token importance values of the tokens of the current record, removing the unimportant token from the token-record mapping, selecting only records sharing at least one common token with the current record such that the at least one common token does not include the token identified as unimportant, and comparing the current record with each of the selected records to determine whether the current record matches any of the selected records.

In some embodiments, the method may include one or more of the following features (or any combination thereof). The tokens may be created using natural language processing that splits values of a respective record into individual tokens. The token importance values may be term frequency-inverse document frequency (tf-idf) values. The method may include identifying a token having a highest token importance value within the current record, marking at least one token as unimportant when a token importance value of the at least one token is less than a predetermined threshold relative the highest token importance value within the current record, and removing the at least one unimportant token from the token-record mapping such that records linked to the at least one unimportant token are not selected for comparison with the current record. The predetermined threshold may be a defined percentage of the highest token importance value. The relational database may be included as part of an in-memory database system having a structured query language (SQL) engine.

The details of one or more implementations are set forth in the accompanying drawings and the description below. Other features will be apparent from the description and drawings, and from the claims.

DETAILED DESCRIPTION

The systems and methods discussed herein provide a token-based entity resolution technique that reduces the number of comparisons to find similar records in a manner that is more efficient and more flexible that the conventional methods. For example, the token-based entity resolution technique described herein may transform records to tokens, create a token-record mapping by linking records to tokens, and calculate token importance values for the tokens. A token importance value may reflect a measure of the amount of information contained within a token. In some examples, the token importance value is a term frequency-inverse document frequency (tf-idf) value indicating how important the token is to the record in a collection of records. The token importance value may increase proportional to the number of times the token appears in the record, but is offset by the frequency of the token in the corpus, which helps to adjust for the fact that some tokens appear more frequently in general. Generally, if a token appears frequently throughout the records (e.g., frequent-occurring token), the token may not reflect a high amount of information, and therefore its token importance value may be relatively low. On the other hand, if a token appears infrequent throughout the records (e.g., infrequent-occurring token), the token may reflect a higher amount of information, and therefore its token importance value may be relatively high.

When determining whether a current record matches other records in a database, the token-based entity resolution technique may select records that share at least one common token with the current record for a subsequent comparison. In particular, instead of comparing every record to the current record to determine whether there is a match, the token-based entity resolution technique selects only the records that share at least one common token with the current record, and those selected records are then compared to the current record. For instance, given any record A, only records containing at least one token generated from record A will be compared to record A. However, according to the embodiments, the amount of records that are selected for comparison can be reduced by removing unimportant tokens (e.g., frequently occurring tokens) from the token-record mapping.

In one example, the current record may include a plurality of tokens such as a first token and a second token. The first token is associated with a first token importance value, and the second token is associated with a second token importance value, where the first token importance value is higher than the second token importance value. The token with the highest token importance value may be identified (e.g., the first token) in the current record. Then, the token importance values of other tokens (e.g., the second token) may be compared to a predetermined threshold that is relative to the highest token importance value (e.g., less than 10%, 20%, 30%, 60%, 70%, etc. of the highest token importance value), and the second token is identified as unimportant when the second token importance value is less than the predetermined threshold relative to the highest token importance value within the current record. The identification of the second token as unimportant may indicate that the second token contains little information to identify records that may be similar to the current record. As such, these unimportant tokens may be removed from the token-record mapping or disregarded when selecting records sharing at least one common token with the current record. In other words, at least one common token that is used as a key for selecting records for comparisons would not include any of the unimportant tokens, and therefore the records linked to the unimportant tokens would not be selected for comparison to the current record.

Therefore, the number of comparisons can be reduced by not using those tokens that appear frequently throughout the set of all records for records containing a combination of frequently and infrequently occurring tokens. In other words, those tokens, whose token importance value falls below the predetermined threshold relative to the largest token importance value found within the current record, are not used when retrieving records against which to compare to the current record. For instance, frequently occurring tokens contain less information and are not as helpful in bringing together records that are likely to match. However, records containing only frequently occurring tokens or only infrequently occurring tokens will have all of their tokens used since all of the token importance values will be similar. That is, all of the token importance values will be above the predetermined threshold relative to the largest token importance value found within the current record indicating that all of the tokens are the same in relative importance. Restricting record comparisons in this way may reduce the resource requirements of the comparison without significantly affecting the results.

Furthermore, the token-based entity resolution technique described herein is capable of processing free-form data, and this technique may be applied to various types of data (e.g., product data, material data, communication data, person data, etc.) without having intimate knowledge about the underlying data. In one example, a table may store product information for an enterprise, and the product listing may be very large (e.g., thousands or millions of records). Furthermore, the records may be created in a relatively unstructured database format, e.g., a single record may provide a series of information that uniquely the product such as brand type, color, volume, etc. (e.g., HS GLOWSHEERS LIGHT 25 1.10 OZ), where the database record is not restricted to certain formats or types of data. The token-based entity resolution technique described herein can be applied to unstructured data in a manner that does not rely upon the intimate details of how the underlying data is structured such as the location of certain parts of data (e.g., where band type information is located in the record, or where the quantity is located in the record).

Figure 1:
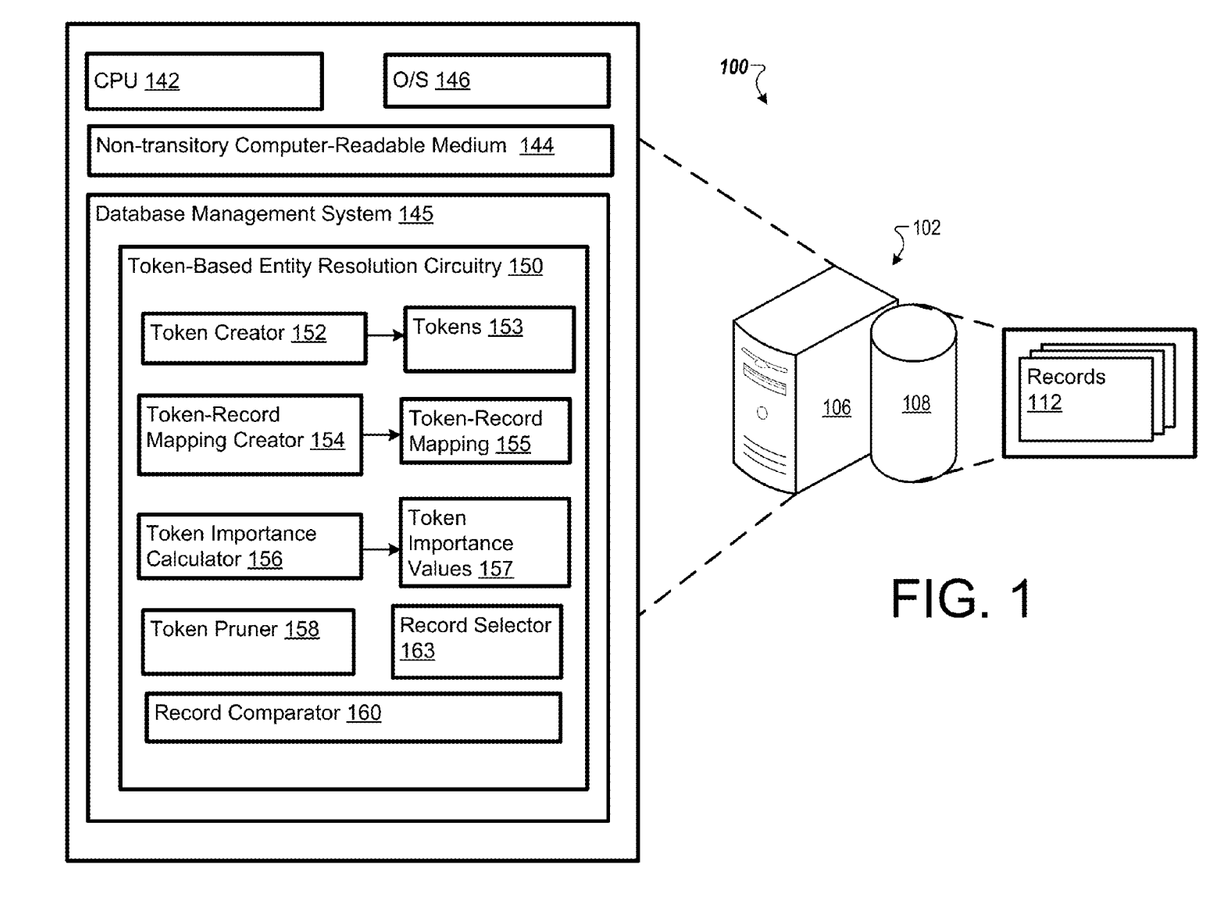
FIG. 1 is a diagram of an example system that reduces the amount of comparisons that are made during entity resolution of records stored in a database according to an implementation.

FIG. 1 is a diagram of an example system 100 that reduces the amount of comparisons that are made during entity resolution of records 112 stored in a database 108 according to an implementation. Entity resolution can generally be defined as a process of determining whether two records in natural language text refer to the same entity (record), and may include data record matching or de-duplication.

The system 100 can include one or more computer systems (e.g., computer system 102). The computer system 102 can include one or more computing devices 106 and one or more computer-readable storage devices (e.g., database(s) 108). The computing device 106 can include one or more processors (e.g., CPU 142), and one or more memory devices (e.g., non-transitory computer-readable medium 144) storing executable instructions that cause the CPU 142 to perform the operations discussed herein (e.g., the token-based entity resolution). The computing device 106 may include an operating system (O/S) 146. The non-transitory computer-readable medium 144 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The CPU 142 may include any type of special purpose logic circuitry, e.g., an FPGA (field programmable gate array) or an ASIC (application-specific integrated circuit). The CPU 142 may include one or more processors coupled to a semiconductor substrate. Also, the system 100 may include various application programming interfaces (APIs) in a manner that permits the system 100 to communicate with other systems, applications, or devices, or permits the computing device 106 to communicate with the database 108. In some examples, the API is SQL, a standard programming language for defining, protecting, and accessing data in the database 108. The computing device 106 can represent or more server computers that interact with client devices over a network.

Figure 9:
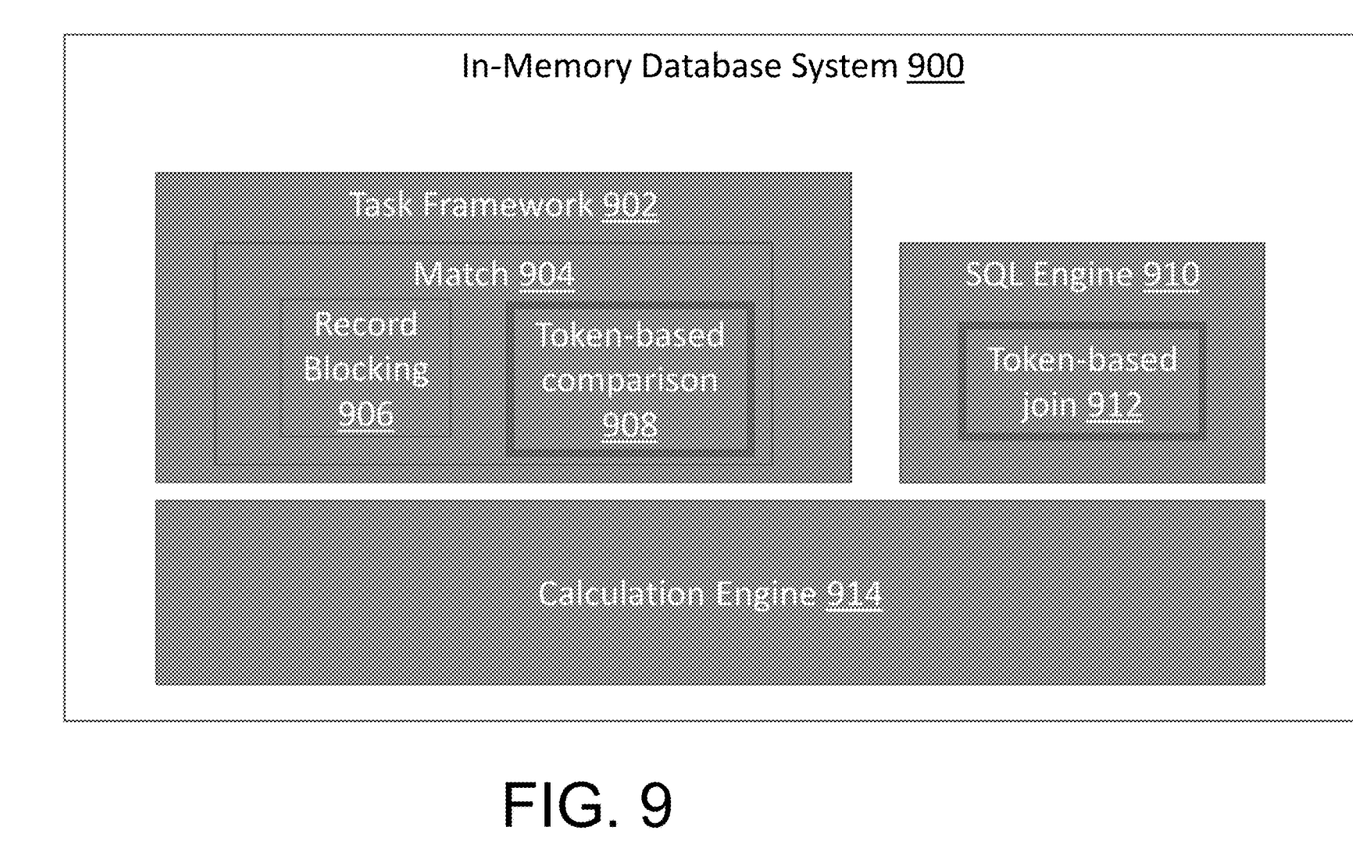
FIG. 9 illustrates an in-memory database system that implements the token-based entity resolution techniques described herein according to an implementation.

The computing device 106 includes a database management system 145. The database management system 145 may be a computer software application (implemented by the CPU 142 and the non-transitory computer-readable medium 144) that interacts with users, other application, and the database 108 to capture and data. The database management system 145 may allow the definition, creation, querying, update, and administration of the database 108. In some examples, the database management system 145 is an in-memory database system (an example of which is illustrated in FIG. 9). In some examples, the database management system 145 is a columnar database management system. In some examples, the database management system 145 is a cloud-based database management system.

The database 108 may store data in the form of records 112. The database 108 may be a single storage device or a collection of multiple storage devices that are managed by the database management system 145. The database 108 may be one or more relational databases. In some examples, the database 108 may be a distributed storage system (e.g., Hadoop). In some examples, the database 108 may be in-memory database, columnar database, and/or a cloud-based database (or a combination of two or more of them). In some examples, incoming records 112 may be inputted to the system 100 from users, systems or other sources through an application programming interface (API), imported programmatically, entered through an input device, or imported from one or more databases. Though FIG. 1 shows a computer system 102, the system 100 may include additional computer systems. The computer systems may be included as part of larger systems for managing records of one or more enterprises. For example, a computer system may be part of or included in a larger machine or system. The computer systems may be located in a same location or in different locations.

The records 112 may be a collection of data items (or single data item) arranged for processing by the database management system 145. In some examples, each record 112 may be of a fixed length. In other examples, some of the records 112 may be of a variable length. In some examples, the records 112 may be rows within one or more tables. In other examples, the records 112 may be columns within one or tables. Each record 112 may store text data such as words, letters, abbreviations, numbers, symbols, and/or special characters. In some examples, the records 112 may include free-form data having an unstructured data format (e.g., without restrictions to form). For instance, when creating a record 112, the database 108 (or portion thereof) may accept all forms of text data (e.g., a record is not restricted to certain types of data). In some examples, each record 112 includes free-form data with a fixed length, which may cause the record creator to use shortened terms, synonyms, abbreviations, etc., with spaces and punctuation marks such as commas, semi-colons, etc. In some examples, the records 112 may include both free-form data and structured data. In some examples, the records 112 only include records having free-form data. In some examples, the records 112 include product or material data associated with an enterprise. In one example, a first record includes a product definition that refers to product A, and a second record includes a product definition that also refers to product A. The product definition of the first record may include the exact description (or similar description) as the product definition of the second record. The first record and the second record may be two records of thousands or millions of records 112 stored in the database 108, but the database management system 145 may reduce the amount of comparisons needed in order to identify the first and second records as the same (or similar to each).

For instance, as described above, when finding similar records within a set of records, one of the challenges is overcoming the N-Squared problem. In a relatively large database, it is impracticable to compare each record to every other record to find which records are similar to each other. However, the database management system 145 included a token-based entity resolution circuitry 150 configured to perform token-based entity resolution operations to identify whether a current record 112 is the same or similar to other records 112 of the database 108 in a manner that reduces the amount of comparisons, thereby decreasing the amount of resources needed by the system 100. Furthermore, the token-based entity resolution approach discussed herein does not rely on intimate knowledge on the underlying data to make the entity resolution process to execute more efficiently. Rather, the token-based entity resolution approach may be applied to many different types of underlying data (including free-form data) without having to change the main steps of the algorithm.

The token-based entity resolution circuitry 150 may be defined by the CPU 142 and the memory 144 which stores executable instructions (that when executed by the CPU 142) causes the CPU 142 to perform the token-based entity resolution operations discussed herein. Because the database 108 may store a relatively large number of records 112 (e.g., thousands/millions of records 112), it would be impossible to manually compare each record to every other record within the database 108 to find which records are similar to each other. Furthermore, the conventional approaches to entity resolution can be computationally demanding, thereby time consuming, particularly at large scales. However, the token-based entity resolution described herein improves the performance of the system 100 itself by reducing the number of comparisons made during entity resolution, thereby decreasing the amount of resources required by the computing device 106 (e.g., may decrease the amount of processing power and memory of the CPU 142 and the memory 144). As further explained below, records 112 are joined to each other on their tokens 153, and only records 112 that share at least one token 153 are compared. Too many frequently occurring tokens 153 can cause too many intermediate results and can result in an error. However, the token-based entity resolution circuitry 150 may remove these frequently occurring tokens, thereby reducing the amount of comparisons which can lead to a reduction (or elimination) in the amount of errors, as further described below.

The token-based entity resolution circuitry 150 may include a plurality of sub-components such as a token creator 152 configured to create tokens 153 from the records 112 of the database 108, a token-record mapping creator 154 configured to create a token-record mapping 155 that maps tokens 153 to records 112, and a token importance calculator 156 configured to calculate token importance values 157 for the tokens 153.

The token-based entity resolution circuitry 150 may also include a token pruner 158, a record selector 163, and a record comparator 160. For example, when evaluating a current record to be matched during entity resolution, the token pruner 158 may identify any unimportant tokens from the tokens 153 of the current record based on the token importance values 157 of the current record, and then remove the unimportant tokens from the token-record mapping 155 such that the unimportant tokens are not used when retrieving records 112 against which to compare to the current record. The record selector 163 is configured to select only the records 112 in the database 108 that share at least one common token with the current record such that the at least one common token does not include any of the tokens 153 identified as unimportant. In this manner, the number of comparisons may be reduced.

The record comparator 160 may compare the current record to each of the selected records (selected by the record selector 163) using a similarity or comparison analysis. The record comparator 160 may utilize any type of similarity or comparison analysis to perform the comparison such as a Jaccard Index-based comparison. For instance, the record selector 163 may select all of the records that share at least one common token (one common token or two or more common tokens) with the current record, but since the records selector 163 ignores or disregards the records 112 linked to the unimportant tokens 153, the number of records 112 selected for comparison by the record comparator 160 is reduced. In some examples, the similarity or comparison analysis may be relatively computationally expensive, and therefore reducing the amount of comparisons performed by the record comparator 160 can increase the speed of the system 100 and/or decrease the amount of resources needed to perform entity resolution of the records 112 of the database 108.

Figure 2:
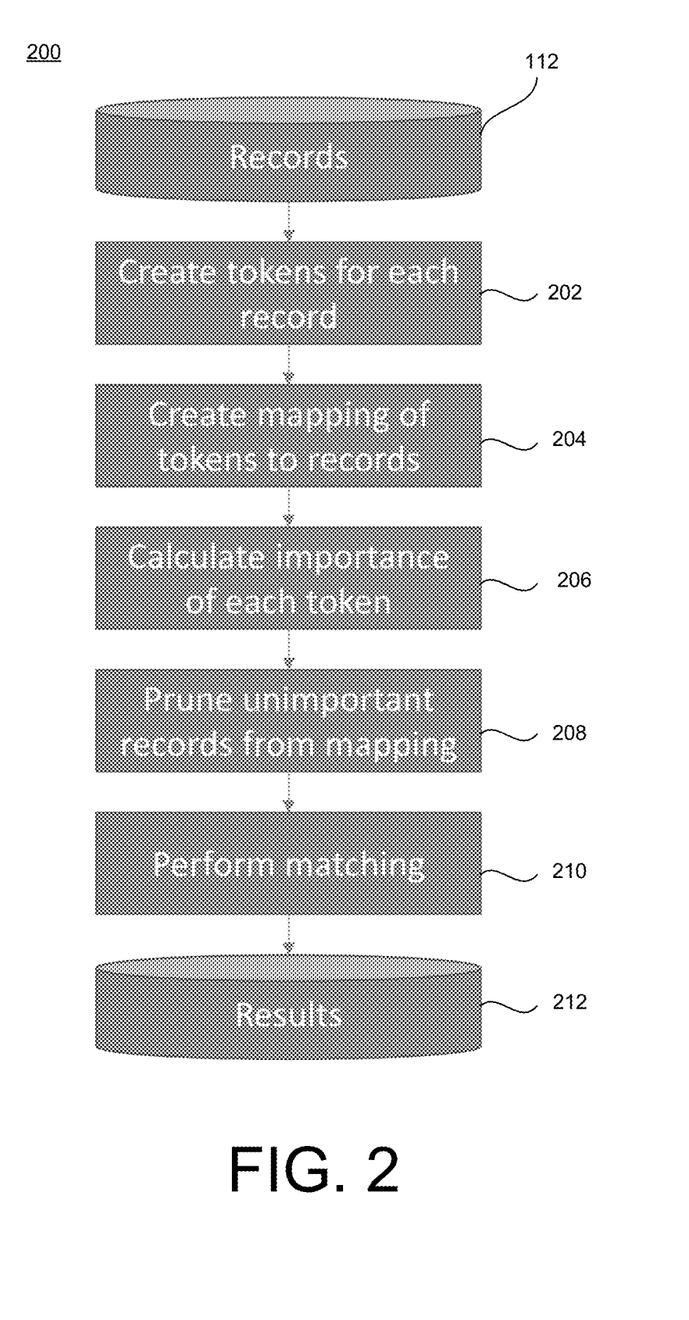
FIG. 2 illustrates example operations of a flowchart for performing token-based entity resolution to reduce the amount of comparisons according to an implementation.

FIG. 2 illustrates example operations of a flowchart 200 for performing token-based entity resolution to reduce the amount of comparisons according to an implementation. Although FIG. 2 is illustrated as a sequential, ordered listing of operations, it will be appreciated that some or all of the operations may occur in a different order, or in parallel, or iteratively, or may overlap in time.

Tokens may be created for each record (operation 202). For example, the token creator 152 may create tokens 153 for each record 112. The token creator 152 may perform natural language processing (NLP) to split the values of a respective record 112 into individual tokens 153. For example, the token creator 152 may split a particular record 112 based on natural character boundaries (e.g. whitespace, transition between digits and letters, etc.) to produce the tokens 153 associated with that record 112. The token creator 152 may create one or a plurality of tokens 153 for a single record 112. The type(s) of NLP(s) used to create the tokens 153 may widely vary depending on the type of underlying data. Each token 153 may include a term from the record 112, and the term may include a word, one or two letters, one or more symbols, one or more numbers, and/or one or more special characters.

Figure 3:
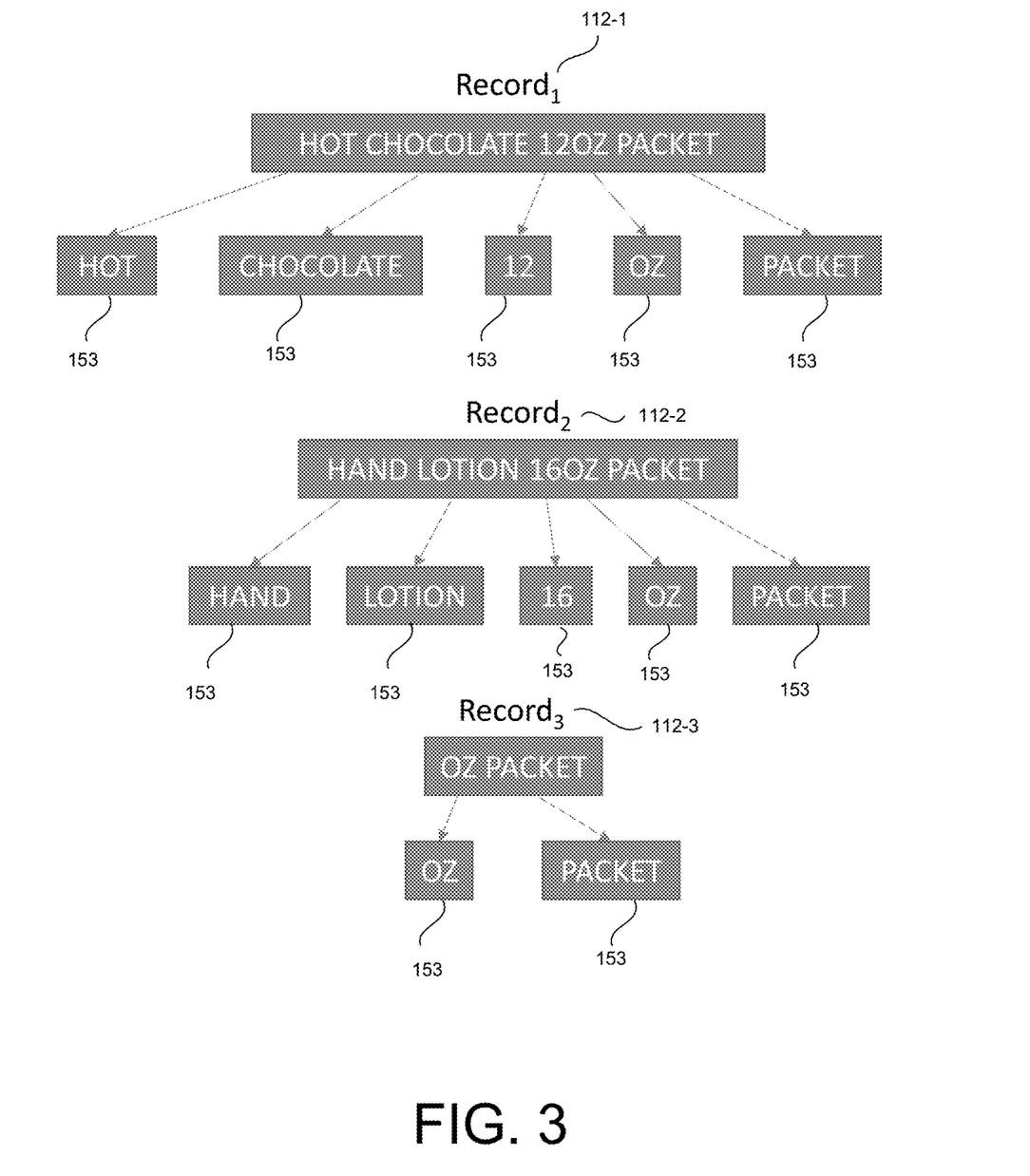
FIG. 3 illustrates a graphical example of creating tokens from records according to an implementation.

FIG. 3 illustrates an example of creating tokens 153 from records 112 according to an implementation. For example, FIG. 3 illustrates the tokenization of three example records, e.g., a first record 112-1, a second record 112-2, and a third record 112-3. The token creator 152 may receive the first record 112-1 (HOT CHOCOLATE 12 OZ PACKET), and create tokens 153 by analysing the content of the first record 112-1 using one or more NLPs. In this example, the first record 112-1 is broken down into the following tokens 153: HOT, CHOCOLATE, 12, OZ, PACKET. For instance, each of these terms corresponds to a different token 153. The token creator 152 may receive the second record 112-2 (HAND LOTION 16 OZ PACKET), and create tokens 153 by analysing the content of the second record 112-2 using one or more NLPs. In this example, the second record 112-2 is broken down into the following tokens: HAND, LOTION, 16, OZ, PACKET. The token creator 152 may receive the third record 112-3 (OZ PACKET), and create tokens 153 by analysing the content of the third record 112-3 using one or more NLPs. In this example, the third record 112-3 is broken down into the following tokens: OZ, PACKET. The token creator 152 may repeat this operation for all records 112 (or a subset of record 112) in the database 108.

Referring back to FIG. 2, a mapping of tokens to records may be created (operation 204). For example, the token-record mapping creator 154 may create a token-record mapping 155 by mapping records 112 to token 153. For example, the token-record mapping creator 154 may perform record linkage to link the records 112 to the tokens 153. In a simple example, a first record may have token A and token B, and a second record may have only token A. The token-record mapping creator 154 may link the first and second records to token A (because the first and second records have token A), and may link the first record to token B. The token-record mapping 155 may be expressed in a data structure that identifies each token 153 created from the records 112, and one or more links that point to the record(s) 112 having the corresponding token 153. In some examples, the token-record mapping 155 recites an index of tokens 153 and the identifiers of the linked records 112 (e.g., a numerical number that uniquely identifies records) are linked to their respective tokens 153.

Figure 4:
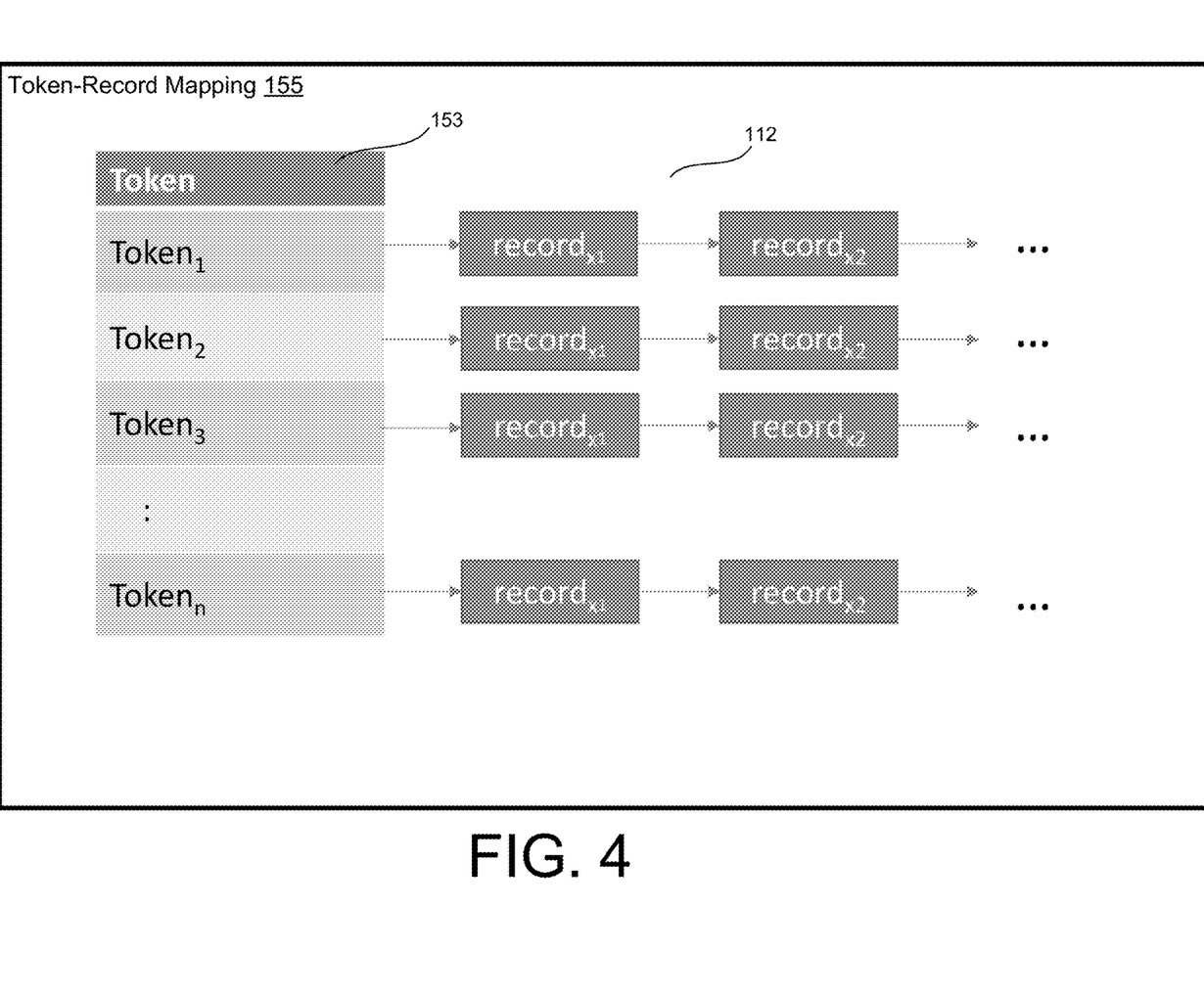
FIG. 4 illustrates a graphical example of a token-record mapping according to an implementation.

FIG. 4 illustrates a graphical example of the token-record mapping 155 according to an implementation. The token-record mapping 155 may include an index of tokens 153, e.g., $token_1$ to $token_n$ (where N may be any integer), and links to the records 112 that have those tokens 153. For example, all the records 112 that have $token_1$ are linked to $token_1$, and all the records 112 that have $token_2$ are linked to $token_2$, etc.

Figure 5:
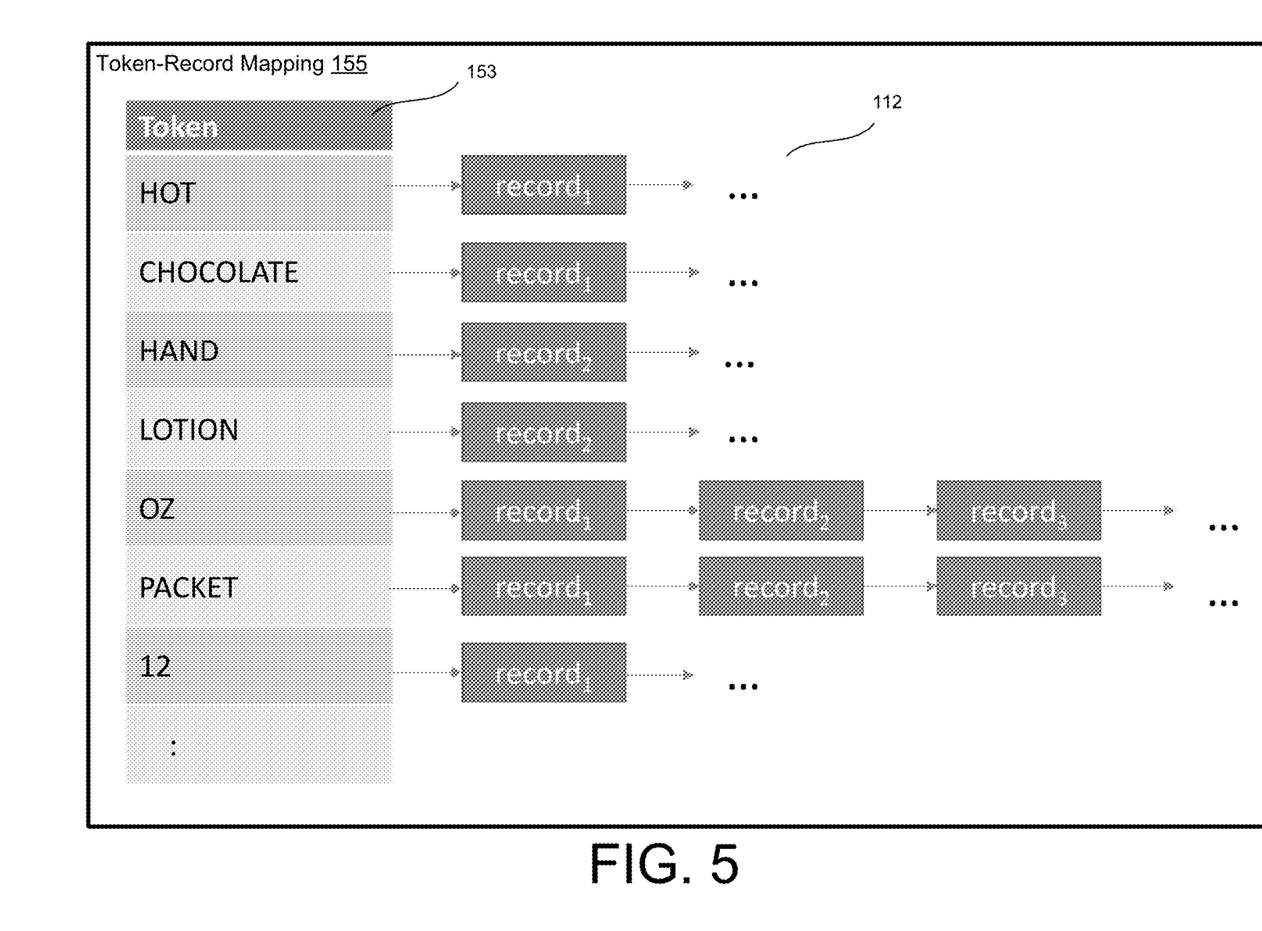
FIG. 5 illustrates a graphical example of the token-record mapping of the records of FIG. 3 according to an implementation.

FIG. 5 illustrates an example of the token-record mapping 155 of the first record 112-1, the second record 112-2, and the third record 112-3 of FIG. 3 according to an implementation. As shown in FIG. 5, the first token is HOT, and all the records 112 that include the token HOT are linked to the token HOT. In this example, the first record 112-1 is linked to the token HOT. The second token is CHOCOLATE, and all the records 112 that include the token CHOCOLATE are linked to the token CHOCOLATE. In this example, the first record 112-1 is linked to the token CHOCOLATE. The third token is HAND, and all the records 112 that include the token HAND are linked to the token HAND. In this case, the second record 112-2 is linked to the token HAND. The fourth token is LOTION, and all the records 112 that include the token LOTION are linked to the token LOTION. In this case, the second record 112-2 is linked to the token LOTION. The fifth token is OZ, and all the records 112 that include the token OZ are linked to the token OZ. In this case, the first record 112-1, the second record 112-2, and the third record 112-3 are linked to the token OZ. The sixth token is PACKET, and all the records 112 that include the token PACKET are linked to the token PACKET. In this case, the first record 112-1, the second record 112-2, and the third record 112-3 are linked to the token PACKET. The seventh token is the token 12, and all the records that include the token 12 are linked to the token 12. In this case, the first record 112-1 is linked to the token 12.

Referring back to FIG. 2, importance of each token may be calculated (operation 206). For example, the token importance calculator 156 may calculate token importance values 157 for the tokens 153. For instance, the token importance calculator 156 may calculate a token importance value 157 for each of the tokens 153. The token importance value 157 may be a numerical statistic that reflects how important the token 153 is to its record in a corpus of records (e.g., the records 112 in the database 108). The token importance value 157 may be a term frequency-inverse document frequency (tf-idf) value. For example, the token importance value 157 may indicate a measure of how much information the token provides, that is, whether the token is common or rare across all records 112. In some examples, the token importance calculator 156 determines the logarithmically scaled inverse fraction of the records 112, obtained by dividing the total number of records 112 by the number of records 112 containing that token, and then taking the logarithm of that quotient. However, the token importance calculator 156 may use any type of tf-idf calculations known to one of ordinary skill in the art to calculate an tf-idf value. The token importance values 157 may be within a range such as 0 to 100 (for example). In some examples, a relatively low token importance value (e.g., 2) may indicate that the token is frequently occurring, and a relatively high token importance value (e.g., 90) may indicate that the token is infrequently occurring. In some examples, the token importance value 157 may increase proportionally to the number of times the token 153 appears in the record, but is offset by the frequency of the token 153 in the corpus of records 112.

Figure 6:
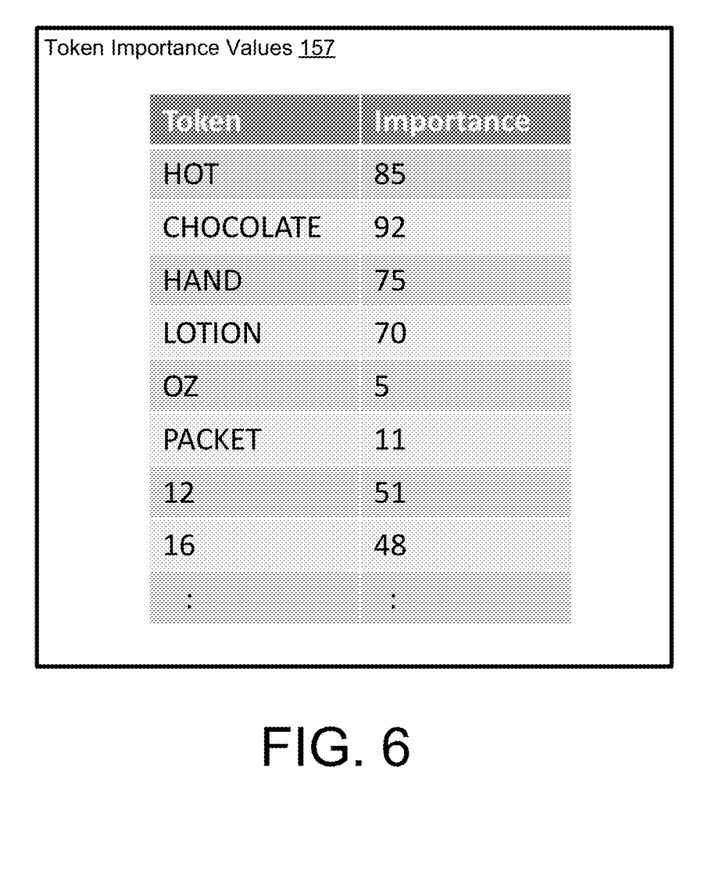
FIG. 6 illustrates an example of a listing of token importance values according to an implementation.

FIG. 6 illustrates an example of the token importance values 157 according to an implementation. For example, FIG. 6 provides a listing of token importance values 157 for the tokens 153, as calculated by the token importance calculator 156. In some examples, the token importance values 157 may be stored in a table on the computing device 106 in a data structure that provide a token importance value 157 for each of the tokens 153 generated by the system 100. As shown in FIG. 6, the token CHOCOLATE has a token importance value of 92, and the token OZ has a token importance value of 12. In some examples, the token OZ may be considered a relatively frequently occurring token, whereas the token CHOCOLATE may be considered a relatively infrequently occurring token.

During entity resolution, in some examples, the token-based entity resolution circuitry 150 may evaluate whether they are any duplicate records in the database 108. The token-based entity resolution circuitry 150 may evaluate each record 112 in the database 108 (or a subset of them) to determine whether there are any duplicates, starting with a first record, and then proceeding to the Nth record. In other examples, during entity resolution, the token-based entity resolution circuitry 150 may receive a query for a particular record, and determine whether any of the records 112 match the record of the query.

In either case, referring back to FIG. 2, unimportant records may be pruned from the mapping (operation 208). For example, when evaluating a current record during entity resolution, unimportant records may be pruned from the token-record mapping 155. For example, the token pruner 158 may identify a token 153 within the current record as unimportant based on the token importance values 157 of the tokens 153 of the current record, and remove the unimportant tokens from the token-record mapping 155, thereby removing the records linked to the unimportant tokens, such that these removed (or unimportant records) are not used by the record comparator 160.

In particular, the token pruner 158 may compare the token importance values 157 contained within the current record 112 to identify whether the current record 112 includes any unimportant tokens. Those tokens 153 whose token importance values 157 falls below a predetermined threshold relative to the largest token importance value found within the current record 112 may be considered unimportant, and are not used when retrieving records 112 against which to compare to the current record 112. Also, records 112 containing only frequently occurring tokens or only infrequently occurring tokens will have of their tokens 153 used since all of the token importance values 157 will be similar. This is, all of the token importance values 157 will be above the predetermined threshold relative to the largest token importance value found within the current record 112 indicating that all of the tokens 153 within the current record 112 are similar or the same in relative importance. Restricting record comparisons in this way reduces the resource requirements of the comparison without significantly affecting the results. Then, the record selector 163 is configured to select only the records in the database 108 that share at least one common token with the current record 112 such that the at least one common token does not include any of the tokens 153 identified as unimportant. In this manner, the number of comparisons may be reduced.

Matching may be performed (operation 210), and the results may be stored in a database (operation 212). For example, the record comparator 160 is configured to compare the current record to each of the selected records using a similarity or comparison analysis. The record comparator 160 may utilize any type of similarity or comparison analysis to perform the comparison such as a Jaccard Index-based comparison. For instance, the record selector 163 may be configured to select all of the records that share at least one common token with the current record, but since the record selector 163 ignores or disregards the records linked to the unimportant tokens, the number of records selected for comparison by the record comparator 160 is reduced.

Figure 7:
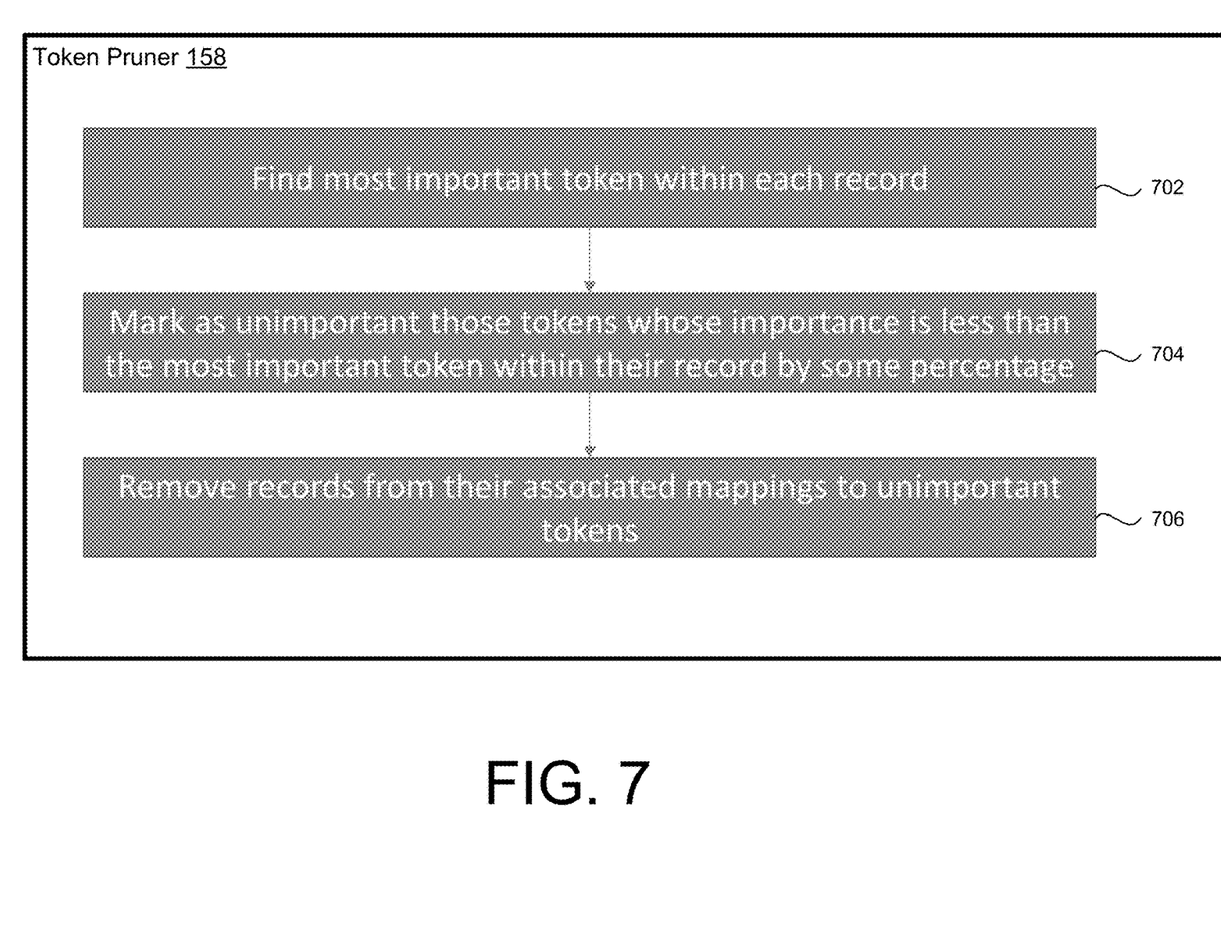
FIG. 7 illustrates example operations of a token pruner according to an implementation.

FIG. 7 illustrates example operations of the token pruner 158 according to an implementation. Although FIG. 7 is illustrated as a sequential, ordered listing of operations, it will be appreciated that some or all of the operations may occur in a different order, or in parallel, or iteratively, or may overlap in time.

The most important token may be found within each record (operation 702). For example, the token pruner 158 may locate the most important token within the current record 112. For instance, the token pruner 158 may identify the token 153 within the current record 112 that has the highest token importance value 157.

Tokens whose importance is less than the most important token within their record may be marked as unimportant (operation 704). For example, if the current record 112 has a combination of frequency occurring tokens and infrequency occurring tokens, the token pruner 158 may mark as unimportant those tokens 153 whose token importance values 157 is less than the most important token by a predefined percentage. Records from their associated mappings to unimportant tokens may be removed (operation 706). For example, the token pruner 158 may remove those records 112 from their associated mapping to unimportant tokens.

Figure 8:
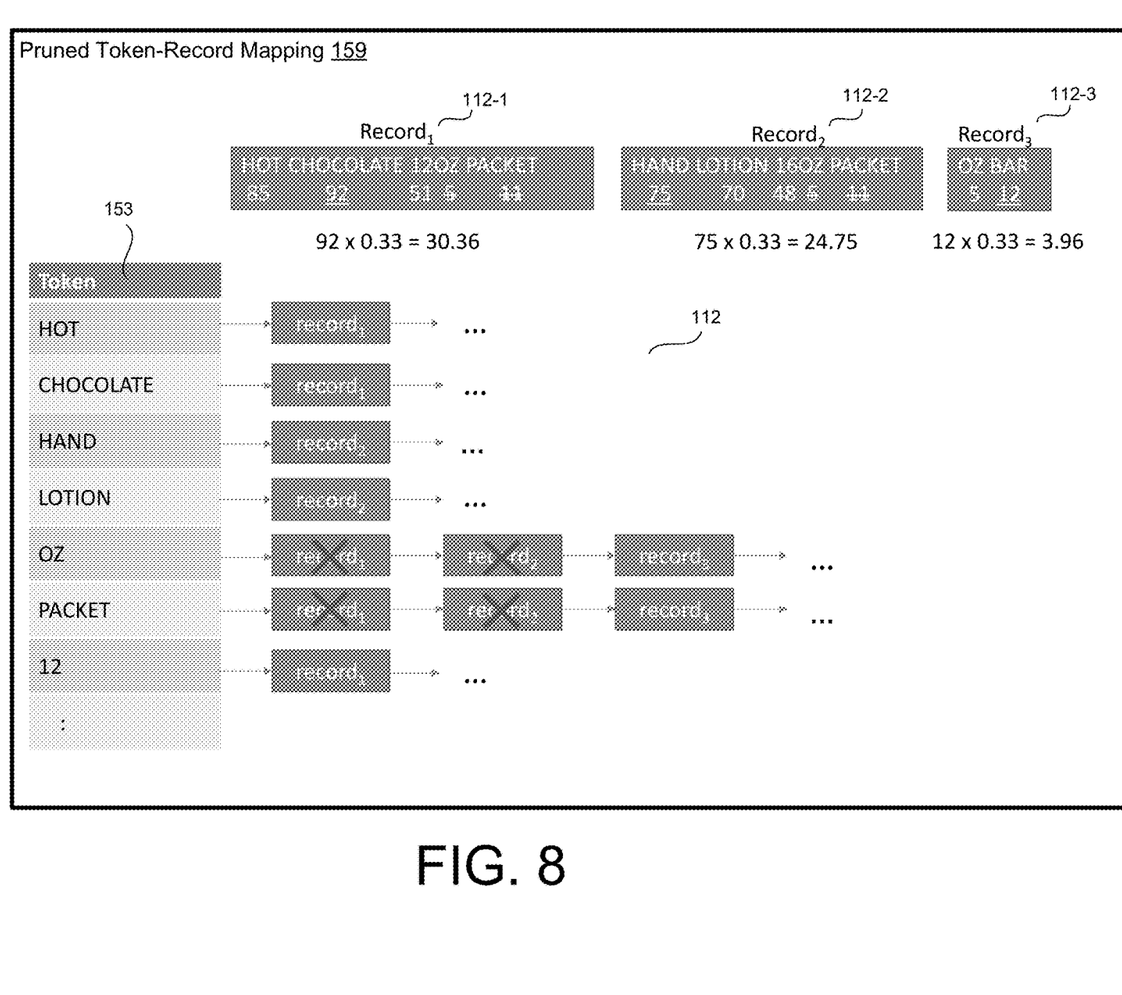
FIG. 8 illustrates a graphical example of a pruned token-record mapping from the example of FIGS. 3, 5, and 6 according to an implementation.

FIG. 8 illustrates an example of a pruned token-records mapping 159 from the example of FIGS. 3, 5, and 6 according to an implementation. For example, FIG. 8 illustrates the tokens of the first record 112-1, the second record 112-2, and the third record 112-3. In this example, when evaluating the first record 112-1 during entity resolution, the token pruner 158 identifies the most important token as the CHOCOLATE token since its token importance value of 92 is the highest among all the token importance values of the first record 112-1. Then, the token pruner 158 may mark as unimportant those tokens 153 whose token importance value 157 is less than the most important token within the first record 112-1 by some percentage (e.g., 67%). However, the predefined threshold or percentage may encompass any type of value, and may depend on the underlying data stored in the records 112. In this case, the token pruner 158 identifies any tokens (within the first record 112-1) having a token importance value of less than 30.36 as unimportant. Therefore, the OZ token and the PACKET token are identified as unimportant in the context of the first record 112-1.

When determining whether the first record 112-1 matches other records in the database 108, the records selector 163 may select records 112 from the database 108 that share at least one common token with the first record 112-1 for a comparison analysis to be carried out by the record comparator 160. In particular, instead of comparing every record to the first record 112-1 to determine whether there is a match, the record selector 163 selects only the records 112 that share at least one common token with the first record 112-1, and the record comparator 160 compares the first record 112-1 to the selected records using any type of comparison or similarity analysis. However, according to the embodiments, the amount of records that are selected for comparison can be reduced by removing tokens 153 having relatively low token importance values from the token-record mapping 155, e.g., unimportant (or frequency-occurring) tokens. For example, the records selector 163 does not use the OZ token and the PACKET token when selecting records 112, as indicated by the pruned token-record mapping 159. As such, the records selector 163 disregards the records 112 that are linked to the OZ token and the PACKET token. However, the record selector 163 selects records 112 having the token HOT and/or the token CHOCOLATE. Then, the record comparator 160 may be configured to perform a match or similarity analysis between the first record 112-1 and only the selected records having the common token.

The process may repeat for all records of the database 108. For example, when evaluating the second record 112-2 during entity resolution, the token pruner 158 identifies the most important token as the HAND token since its token importance value of 75 is the highest among all the token importance values of the second record 112-2. Then, the token pruner 158 may mark as unimportant those tokens 153 whose token importance value 157 is less than the most important token within the second record 112-2 by some percentage (e.g., 67%). In this case, the token pruner 158 identifies any tokens (within the second record 112-2) having a token importance value of less than 24.75 as unimportant. Therefore, the OZ token and the PACKET token are identified as unimportant in the context of the second record 112-2.

When determining whether the second record 112-2 matches other records in the database 108, the records selector 163 may select records 112 from the database 108 that share at least one common token with the second record 112-2 for a subsequent comparison analysis executed by the record comparator 160. In particular, instead of comparing every record to the second record 112-2 to determine whether there is a match, the records selector 163 selects only the records 112 that share at least one common token with the second record 112-2, and the record comparator 160 is configured to compare the second record 112-2 to those selected records 112 using any type of comparison or similarity analysis. However, according to the embodiments, the amount of records that are selected for comparison can be reduced by removing tokens 153 having relatively low token importance values from the token-record mapping 155, e.g., unimportant (or frequency-occurring) tokens. For example, the records selector 163 does not use the OZ token and the PACKET token when pulling records 112. As such, the records selector 163 disregards the records 112 that are linked to the OZ token and the PACKET token. However, the records selector 163 selects records 112 having the token HOT and/or the token CHOCOLATE. Then, the record comparator 160 may be configured to perform a match or similarity analysis between the second record 112-2 and only the selected records.

When evaluating the third record 112-3 during entity resolution, the token pruner 158 identifies the most important token as the BAR token since its token importance value of 12 is the highest among all the token importance values of the third record 112-3. Then, the token pruner 158 may mark as unimportant those tokens whose importance is less than the most important token within the third record 112-3 by some percentage (e.g., 67%). In this case, the token pruner 158 identifies any tokens (within the third record 112-3) having a token importance value of less than 3.96 as unimportant. Since none of the tokens in the third record 112-3 have a token importance value of less than 3.96, none of the tokens in the third record 112-3 are marked as unimportant. In this case, since none of the tokens in the third record 112-3 are marked as unimportant in the context of the third record 112-3, the token-record mapping 155 is not pruned with respect to the third record 112-3.

FIG. 9 illustrates an in-memory database system 900 that implements the token-based entity resolution techniques described with reference to the previous figures according to an implementation. The in-memory database system 900 is a type of a relational database management system (RDBMS) that relies on main memory for computer data storage. In contrast, conventional database systems employ a disk storage mechanism. In some examples, the in-memory database system 900 includes a combination of main memory and disk storage. Also, the in-memory database system 900 may support real-time analytics and transactional processing including replication and aggregation techniques. Also, within the in-memory database environment, query/calculation logic is pushed down into the database layer (as opposed to remaining in the application layer) such that the processing time for querying and manipulating the data within the database (e.g., database 108) may be reduced as compared with conventional relational database systems. In some examples, the in-memory database system 900 may be HANA Enterprise 1.0 (any other versions) that is developed by SAP.

The in-memory database system 900 may include a task framework 902 having a match component 904. The task framework is a processing abstraction within the in-memory database system 900 that permits the processing of data to be described as a task plan. A task plan is a directed acyclic graph of transforms where each transform represents a specific type of processing. Conceptually, data is passed from one transform and the corresponding output data is passed to the next transform in the graph until a terminal transform is reached. The match component 904 includes a token-based comparison component 908 configured to execute the token-based entity resolution circuitry 150 within the context of the in-memory database system 900. Also, the in-memory database system 900 may employ record blocking 906 as an additional mechanism to identify similar records.

The in-memory database system 900 may include a SQL engine 910 that includes one or more engines that process queries using SQL. The SQL engine 910 may execute queries according to an SQL model. Typically, the SQL engine 910 may process queries (or portions of queries) that require relational operators such as joins, unions, intersections, differences, selections, projections, joins, and sorting, etc. The SQL model may be a query plan or query scenario for querying the database. The SQL model may include a collection of operators designed to accomplish the functions related to the query. The SQL model may include an arrangement of operator nodes that encapsulate relational operations for executing the query. The operator nodes may be arranged in a tree structure, where results flow from a lower portion of the tree to an upper portion of the tree. Each operator node may include zero or more child nodes, where output from the child nodes are fed as input to related parent nodes. For instance, a join node may include two child nodes that may represent two join operands, whereas a sort node may include a single child node with the input for sorting. Leaves of the tree may include operator nodes that produce results by scanning tables, including performing index scans and/or sequential scans.

The SQL engine 910 may be configured to perform a token-based join 912 that combines columns from one or more tables in the database. The token-based join 912 may implement the functionalities of the token-based entity resolution circuitry 150 within the context of the in-memory database system 900 in order to identify records 112 that match (or substantially match) a query received by the SQL engine 910. For example, the SQL engine 910 may receive a query that identifies a particular record (or includes query terms to locate a match). The SQL engine 910 may include the token-based entity resolution circuitry 150 (or a portion thereof) to identify similar records that meet the request.

The task framework 902 and the SQL engine 910 may reside on top of a calculation engine 914. The calculation engine 914 executes queries based on calculation models. In some examples, the calculation engine 914 is used for complex calculations that cannot be accomplished by the SQL engine 910. The calculation engine 914 may execute the calculation models to obtain the calculation views. Also, the calculation engine 914 may execute a series of calculation models that may be joined or stacked to produce multiple calculation views. The calculation views may be graphical views that consume other analytical, attribute, and/or calculation views and tables. The calculation views may include union, join, projection, and aggregation nodes (or any combination thereof), and provides enhanced features such as distinct, count, calculation, and dynamic joins. The calculation model is a generic query model that provides the framework for querying data in the database in an efficient manner. Similar to the SQL model, the calculation model specifies one or more operator nodes that encapsulate operations for executing the query, and the operator nodes may be arranged in a tree structure, where results flow from a lower portion of the tree to an upper portion of the tree. However, the calculation model may specify relatively more complex operations on the data in order to provide one or more calculation views. The calculation model may include custom calculation flows that provide enhanced functionality in contrast to standard SQL implemented by the SQL engine 910.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program having the non-transitory computer readable medium, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. The programmable processors may be coupled to one or more semiconductor substrates. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for reducing an amount of comparisons during entity resolution of records, the system comprising:
    an in-memory database system configured to store a plurality of records; and
    token-based entity resolution circuitry configured to determine whether a current record is similar to one or more other records in the database, the token-based entity resolution circuitry including:
        a token creator configured to create tokens from the plurality of records;
        a token-record mapping creator configured to create a token-record mapping of tokens to records;
        a token importance calculator configured to calculate token importance values for the tokens, each token importance value representing a level of amount of information contained within a respective token;
        a token pruner configured to identify a token of the current record as unimportant based on token importance values of the tokens of the current record, the token pruner configured to remove the unimportant token from the token-record mapping, the identification and removal of the unimportant token comprising:
            identifying a token having a highest token importance value within the current record;
            marking at least one token as unimportant when a token importance value of the at least one token is less than a predetermined threshold relative to the highest token importance value in the current record; and
            removing the at least one unimportant token from the token-record mapping such that records linked to the at least one unimportant token are not selected for comparison with the current record; and
        a record selector configured to select only records sharing at least one common token with the current record such that the at least one common token does not include the token identified as unimportant; and
        a record comparator configured to compare the current record with each of the selected records to determine whether the current record matches any of the selected records.

2. The system of claim 1, wherein the database includes a relational database.

3. The system of claim 1, wherein the token creator is configured to create one or more tokens for each record using natural language processing that splits values of a respective record into individual tokens.

4. The system of claim 1, wherein the token importance values are term frequency-inverse document frequency (tf-idf) values.

5. The system of claim 1, wherein the predetermined threshold is a defined percentage of the highest token importance value.

6. The system of claim 1, wherein the records include free-form data having an unstructured data format.

7. The system of claim 1, wherein the system is an in-memory database system having a structured query language (SQL) engine configured to execute the token-based entity resolution circuitry to select records similar to the current record.

8. A non-transitory computer-readable medium storing executable instructions that when executed cause at least one processor to:
   create tokens from a plurality of records stored in a relational database comprising an in-memory database system;
   create a token-record mapping of tokens to records;
   calculate token importance values for the tokens, each token importance value representing a level of amount of information contained within a respective token;
   identify a token of a current record as unimportant based on token importance values of the tokens of the current record;
   remove the unimportant token from the token-record mapping, the identification and removal of the unimportant token comprising:
      identifying a token having a highest token importance value within the current record;
      marking at least one token as unimportant when a token importance value of the at least one token is less than a predetermined threshold relative to the highest token importance value in the current record; and
      removing the at least one unimportant token from the token-record mapping such that records linked to the at least one unimportant token are not selected for comparison with the current record;
   select only records sharing at least one common token with the current record such that the at least one common token does not include the token identified as unimportant; and
   compare the current record with each of the selected records to determine whether the current record matches any of the selected records.

9. The non-transitory computer-readable medium of claim 8, wherein the tokens are created using natural language processing that splits values of a respective record into individual tokens.

10. The non-transitory computer-readable medium of claim 8, wherein the token importance values are term frequency-inverse document frequency (tf-idf) values.

11. The non-transitory computer-readable medium of claim 8, wherein the predetermined threshold is a defined percentage of the highest token importance value.

12. The non-transitory computer-readable medium of claim 8, wherein the records include free-form data having an unstructured data format.

13. A computer-implemented method for entity resolution, the method comprising:
   creating tokens from a plurality of records stored in a relational database comprising an in-memory database system;
   creating a token-record mapping of tokens to records;
   calculating token importance values for the tokens, each token importance value representing a level of amount of information contained within a respective token;
   identifying a token of a current record as unimportant based on token importance values of the tokens of the current record;
   removing the unimportant token from the token-record mapping, the identification and removal of the unimportant token comprising:
      identifying a token having a highest token importance value within the current record;
      marking at least one token as unimportant when a token importance value of the at least one token is less than a predetermined threshold relative to the highest token importance value in the current record; and
      removing the at least one unimportant token from the token-record mapping such that records linked to the at least one unimportant token are not selected for comparison with the current record;
   selecting only records sharing at least one common token with the current record such that the at least one common token does not include the token identified as unimportant; and
   comparing the current record with each of the selected records to determine whether the current record matches any of the selected records.

14. The method of claim 13, wherein the tokens are created using natural language processing that splits values of a respective record into individual tokens.

15. The method of claim 13, wherein the token importance values are term frequency-inverse document frequency (tf-idf) values.

16. The method of claim 13, wherein the predetermined threshold is a defined percentage of the highest token importance value.

17. The method of claim 13, wherein the relational database is included as part of an in-memory database system having a structured query language (SQL) engine.

* * * * *